United States Patent [19]

Krasnjanski

[11] Patent Number: 4,509,131

[45] Date of Patent: Apr. 2, 1985

[54] GEOMAGNETIC VELOCIMETER

[75] Inventor: David Krasnjanski, Philadelphia, Pa.

[73] Assignee: The United States of America as represented by the Secretary of the Navy, Washington, D.C.

[21] Appl. No.: 383,429

[22] Filed: Jun. 1, 1982

[51] Int. Cl.³ ........................ G01P 3/42; G06F 15/336

[52] U.S. Cl. ........................................ 364/565; 73/518; 324/179; 364/728

[58] Field of Search ............... 364/565, 728, 604, 819, 364/824; 73/861.06, 518; 324/160, 163, 179, 301, 178, 331

[56] References Cited

U.S. PATENT DOCUMENTS

| | | | |
|---|---|---|---|
| 2,785,376 | 3/1957 | Hazeltine | 324/163 |
| 3,038,338 | 6/1962 | Boitnott | 73/382 G |
| 3,114,264 | 12/1963 | Williamson | 73/382 G |
| 3,180,151 | 4/1965 | Gustafsson | 73/382 G |
| 3,490,032 | 1/1970 | Zurflueh | 324/331 X |
| 3,639,828 | 2/1972 | Salvi | 324/301 |
| 3,688,584 | 9/1972 | Stone et al. | 73/382 G |
| 3,704,626 | 12/1972 | Stone | 73/382 G |
| 3,731,537 | 5/1973 | Trageser | 73/382 G |
| 3,777,133 | 12/1973 | Beck et al. | 364/728 |
| 3,804,518 | 4/1974 | Meyr | 364/824 |
| 3,815,418 | 6/1974 | Bradley | 73/382 |
| 3,818,231 | 6/1974 | Gopal et al. | 364/819 |
| 3,824,015 | 7/1974 | Petit et al. | 364/604 |
| 4,041,293 | 8/1977 | Kihlberg | 364/565 |
| 4,126,047 | 11/1978 | Sethares et al. | 73/505 |
| 4,126,823 | 11/1978 | Dalton, Jr. | 324/301 |
| 4,248,085 | 2/1981 | Coulthard | 73/861.06 |
| 4,317,077 | 2/1982 | Zwarts | 324/179 |
| 4,427,943 | 1/1984 | Cloutier et al. | 324/301 |
| 4,430,722 | 2/1984 | Massen et al. | 364/728 |

FOREIGN PATENT DOCUMENTS

| | | | |
|---|---|---|---|
| 81-03708 | 12/1981 | European Pat. Off. | 364/565 |

*Primary Examiner*—Felix D. Gruber
*Attorney, Agent, or Firm*—Robert F. Beers; Henry Hansen

[57] ABSTRACT

A velocity measuring system utilizes a pair of magnetic sensors each mounted in a displaced location with respect to the other on a vehicle whereby such sensors passing over the same stationary base location at different times provide geomagnetic field signals to a correlator circuit for producing a value for the ground speed of the vehicle.

4 Claims, 4 Drawing Figures

12a SENSOR
At
14a A/D
An
15a STORAGE REGISTER
16 SHIFT REGISTER
An-s
An-sBn
20 MULTIPLIER
22 AVERAGER
12b SENSOR
Bt
14b A/D
15b STORAGE REGISTER
Bn
24 ENVELOP DETECTOR
13 CONTROLLER
C
S
E
28 MICROPROCESSOR
VEL = d / TIME DELAY
26 THRESHOLD DETECTOR
F
D
G
VELOCITY DISPLAY

GEOMAGNETIC VELOCIMETER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to velocity determination by correlation of geomagnetic fields and more particularly to two magnetic sensors mounted in displaced locations on a moving vehicle each providing geomagnetic field related signals to a correlator for determining the vehicle ground speed.

In the field of velocity measurement, it has been the general practice to employ Doppler velocity sensor devices to provide velocity data relative to ground or water for navigation and flight control purposes. Although such devices serve the purposes, they have not proved entirely satisfactory under all conditions of service. Difficulties have been experienced such as measurement errors and frequent loss of signals when flying over water, poor dynamic response when measuring changes in velocity, and the compromising of covert activity due to detection of radiated energy. Additionally, although electromagnetic log devices used exclusively on ships and submarines provide an independent source of own ship velocity reference for damping SINS SCHELUR type oscillations, difficulties such as increased sensitivity to hydrodynamic effect, water currents, and altitude are encountered when measuring velocity with respect to water mass.

SUMMARY OF THE INVENTION

The general purpose of this invention is to provide a velocity measuring system which embraces all the advantages from similarly employed DOPPLER velocity and electromagnetic devices but possesses none of the described disadvantages. To attain this, the present invention utilizes a unique arrangement of two magnetic sensors mounted in a displaced location with respect to each other on a moving vehicle whereby each sensor passing over the same stationary base location at different times provides geomagnetic field signals to a correlator for producing a value for the ground speed of the vehicle. An object of the present invention is to provide a system having the capability of determining the ground speed of an aircraft, a ship, or submarine for navigation and fire control purposes. Another object is to provide a system for determining vehicle ground speed globally, regardless of weather conditions. A further object of the invention is to provide a system for determining vehicle ground speed without the radiation of energy therefrom and resultant compromising of vehicle covertness. Still another object is to provide a system for determining vehicle ground speed that is not susceptible to jamming. Still another object is to provide a system for determining vehicle ground speed without knowledge of actual magnetic fields or mapped storage thereof. Yet another object of the present invention is to provide a system for determining vehicle ground speed which is not affected by temporal or spatial variations in magnetic field.

Other objects, advantages, and novel features of the invention will become apparent from the following detailed description of the invention when considered in conjunction with the accompanying drawings wherein:

DESCRIPTION OF THE PREFERRED EMBODIMENT

Figure 1:
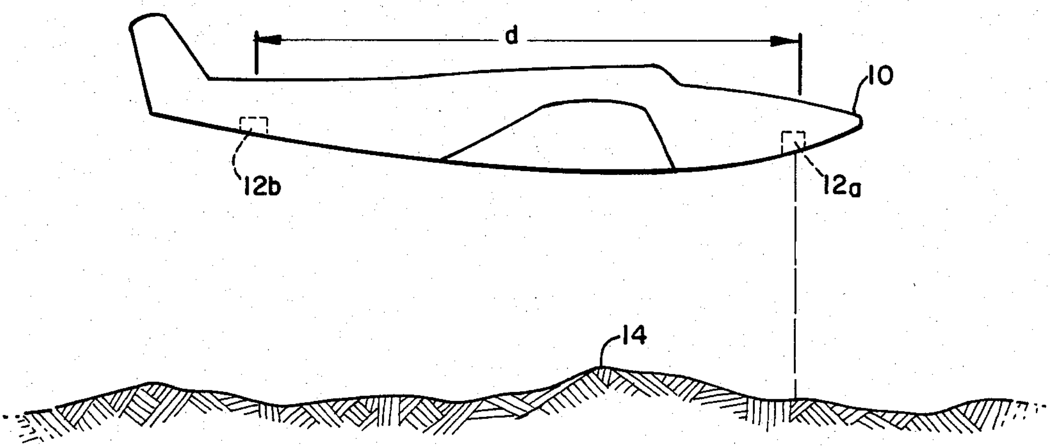
FIG. 1 illustrates the side view of an aircraft showing the displaced locations of a pair of magnetic sensors employed in accordance with the present invention.

Referring now to the drawings, wherein like reference characters designate like or corresponding parts throughout the several views, there is shown in FIG. 1, an aircraft 10 having magnetic sensors 12*a* and 12*b* positioned a longitudinal distance D apart from each other on aircraft 10. The magnetic sensors 12*a* and 12*b* are mounted apart so that each passes over the same earthed-based location at different times. Earthed-based locations such as location 14 of the terrain shown in FIG. 1 provide geomagnetic fields $FMt_1$ and $FMt_2$, consisting essentially of an internal field Fi generated in the core of the earth and anomalous fields Fa arising from inhomogeneities in the outer earth layer. Correlation of the two signals $FMt_1$ and $FMt_2$ as received from the earthed-based location 14 produces a value for the ground speed of aircraft 10.

Figure 2:
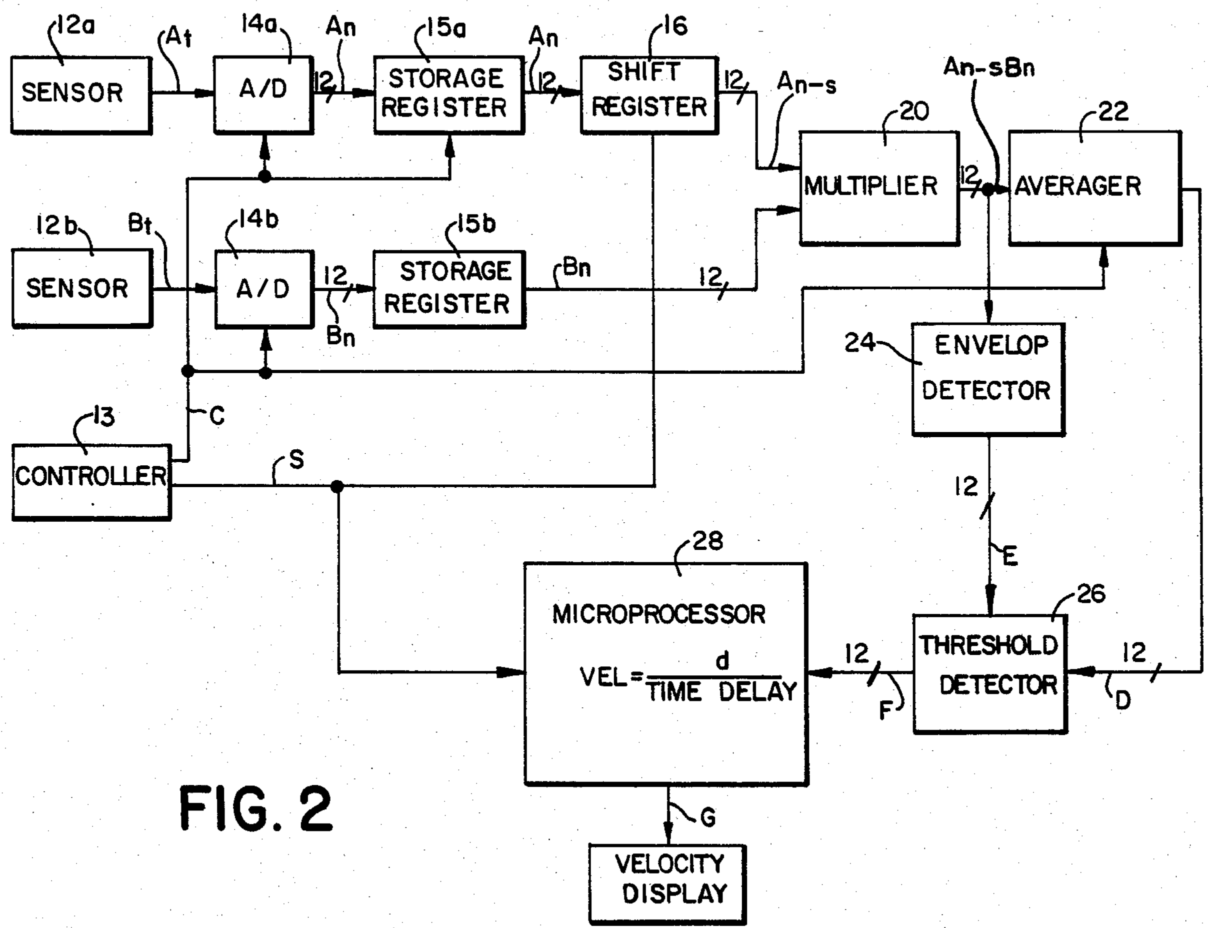
FIG. 2 is a block diagram of a preferred embodiment of the invention.
Figure 3:
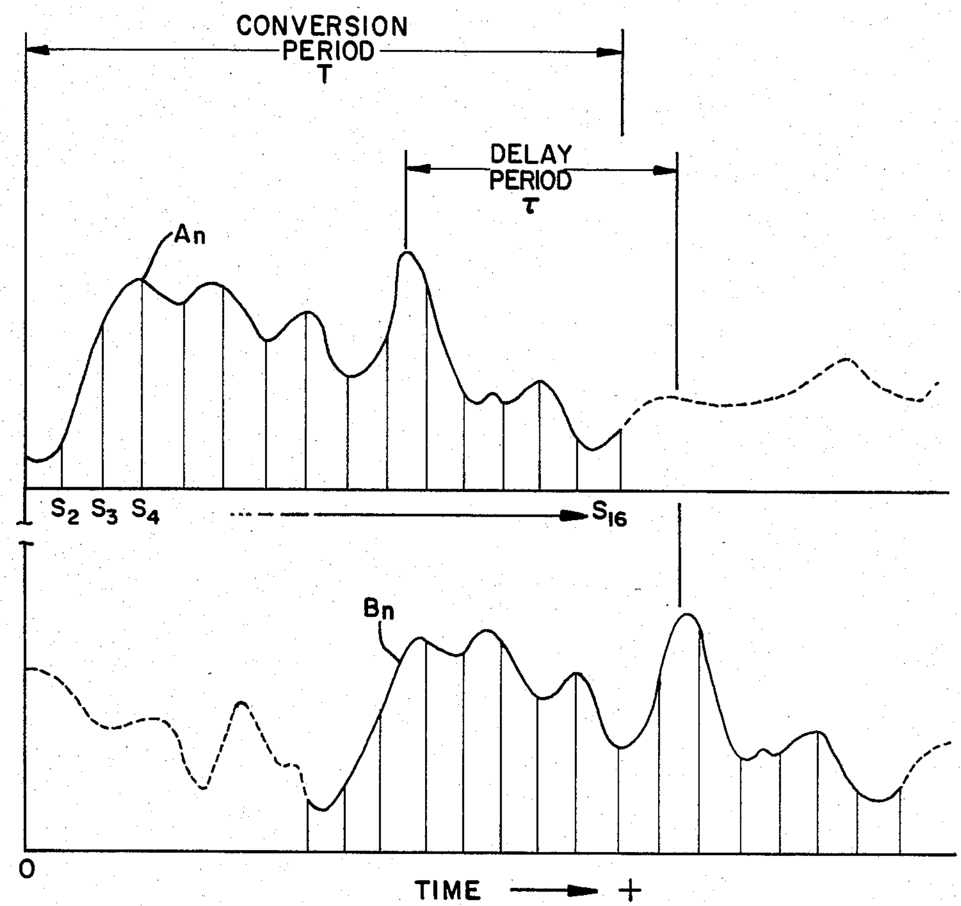
FIG. 3 is a drawing of a stationary sample of a geomagnetic field signal A(t) from a first sensor and a delayed geomagnetic field signal B(t) from a second magnetic sensor of the invention as shown in FIG. 2.
Figure 4:
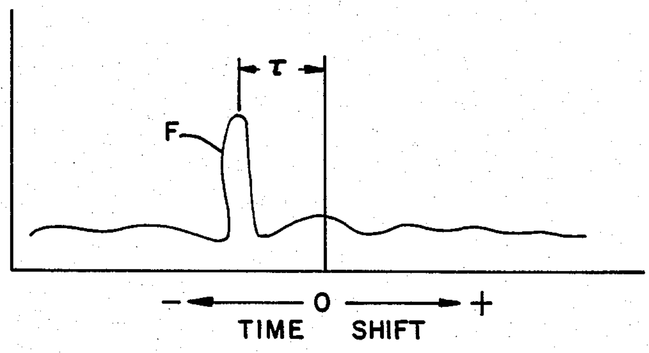
FIG. 4 is a cross correlation function indicating the measure of similarity between signals A(t) and B(t) of the invention as shown in FIG. 2.

Referring to FIG. 2, magnetic sensors 12*a* and 12*b* are similar magnetometers suitable for airborne applications such as a flux gate, proton precession, or optical absorption magnetometers having the capabilities of providing respective sensitivities in the range of 0.01 to 1.0 gamma. Magnetic sensor 12*a* mounted in a forward area of aircraft 10 receives magnetic field FM at time $t_1$ and provides an analog signal $A_t$ indicative thereof. Sensor 12*b* mounted in an aft area of the aircraft at a fixed longitudinal distance d from sensor 12*a* receives the magnetic field FM at time $t_2$ and provides an analog signal $B_t$ indicative thereof. Analog to digital converters 14*a* and 14*b* are connected to receive instantaneous values of signals $A_t$ and $B_t$ and a convert signal C for respectively providing in each conversion period T digitized signals $A_n$ and $B_n$ comprising values thereof in incremental form. Signals $A_n$ and $B_n$ are data samples of the input signals $FMt_1$ and $FMt_2$ respectively and are each comprised of twelve parallel bits. A controller 13 is connected to provide a shift signal S comprising a pulse having a repetition rate of 100 hertz and convert signal C having a repetition rate of 50 hz. Storage registers 15*a* and *b* are connected to receive signals $A_n$ and $B_n$ respectively for providing storage thereof until the succeeding convert signal C is received. Registers 15*a* and *b* are refreshed with new input data with each signal C. A shift register 16 is connected to receive signal $A_n$, move it to the right as a function of signal S and to provide signal $A_{n-s}$. Signal $A_{n-s}$ is indicative of signal $A_n$ delayed by a period t equivalent to the number of shifts that have occurred prior to achieving maximum correlation. A multiplier circuit 20 of conventional design is connected to receive signals $A_{n-s}$ and $B_n$ for providing the product signal $A_{n-s} B_n$. An averager circuit 22 of conventional design is connected to receive product signal $A_{n-s}B_n$ to provide a signal D indicative of the similarity or cross-correlation of signals $A_{n-s}$ and $B_n$. Signal D is mathematically stated as:

$$D = \frac{1}{N-s} \sum_{n=1}^{N-1} A_{n-s}B_n$$

N=the number of samples
s=delay in number of shifts
n=time delay between shifts

An envelope detector circuit 24 of conventional design is connected to receive signal $A_{n-s}B_n$ and to provide a signal E indicative of the envelope or amplitude level of signal $A_{n-s}B_n$. A threshold and peak detector circuit 26 of conventional design is connected to receive signal E and signal D and to provide signal F indicative of the maximum similarity or maximum correlation of geomagnetic signals $FMt_1$ and $FMt_2$. A microprocessor 28 of conventional design for storing and utilizing a statistical filter program of conventional design is connected to receive signals F and S for providing signal G indicative of the ground velocity of the moving aircraft. As a result of noise and randomness of the input signals $FMt_1$ and $FMt_2$, signal F is caused to vary necessitating the statistical filter program to determine by statistical computations the true maximum similarity of signals $FMt_1$ and $FMt_2$. Within microprocessor 28 the number of shifts, which occur between two successive convert signals C are determined by a process of counting and storing shift signals S. The number of shift signals S corresponding with true maximum similarity signal F from the statistical filter is the true delay period between signal $FMt_1$ and $FMt_2$. The true delay period is divided into a stored constant d equal to the physical distance between sensor 12a and 12b resulting in the true velocity therefore $$\text{Velocity}_{\text{true}} = \frac{\text{Distance between receivers}}{\text{optimum time delay}}$$

In summary, operation of the present invention is explained with reference to FIGS. 1-4. The magnetometers 12a and 12b, are mounted in the fore and aft positions of aircraft 10 at the center maneuver axis of the aircraft's magnetic centroids to minimize magnetic noise. During normal flight the magnetic sensor 12a at a time $t_1$ receives a terrain generated magnetic anomaly providing analog signal $A_t$. At a later time $t_2$, depending on the speed of the aircraft, sensor 12b receives the magnetic anomaly providing analog signal $B_t$. Signal $A_t$ and $B_t$ are converted to digitized signals $A_n$ and $B_n$ respectively. Signal $A_n$ is delayed through a shift register 16 prior to being provided to multiplier circuit 20 whereas signal $B_n$ is directly applied to multiplier circuit 20 20. The output of multiplier 20 is averaged by averager circuit 22 and envelope detected by envelope detector 24. At the peak of the detected envelope the average signal F is provided to microprocessor 28 for processing by a statistical filter program residing therein. Microprocessor 28 also receives signal S from controller 13 and provides signal G to display the ground velocity of the moving aircraft 10.

Therefore, some of the many advantages of the present invention should now be apparent. A magnetic velocity measuring system comprising a pair of magnetic sensors separated by a fixed distance and a signal correlator to measure the time difference between the signals from the sensors provides velocity of the true ground speed of the aircraft. The system provides global all weather speed over ground of the moving aircraft. No radiation is emitted from the system and therefore it is covert and unjammable. The system utilizes magnetic gradiometers. There is no requirement for prior knowledge of actual magnetic fields and no map storage. The system is not affected by temporal or spatial variations in magnetic field. The present invention is reliable and easily adapted for use in combination with other magnetic systems presently used on military aircraft.

Obviously, other embodiments and modifications of the present invention will readily come to those ordinarily skilled in the art having the benefits of those teachings presented in the foregoing teachings. It is therefore to be understood that various changes in the details, materials, steps, and arrangement of parts, which have been described and illustrated to explain the nature of the invention, may be made by those skilled in the art within the principal and scope of the invention as expressed in the appended claims.

What is claimed is:

1. A system for determining ground velocity of a vehicle comprising, in combination:

first and second sensor means mounted a predetermined distance apart in forward and aft sections respectively of the vehicle for detecting geomagnetic fields and providing first and second signals indicative thereof; and computer means connected to receive the first and second signals and for providing an output signal indicative of the ground velocity, said computer means comprising controller means for providing a shift signal, correlator means connected to receive the first and second signals and the shift signal for providing a maximum similarity signal indicative of the maximum similarity of said first and second signals, and processor means connected to receive the maximum similarity signal and the shift signal for calculating the vehicle velocity based on the predetermined distance between said first and second sensor means.

2. The system according to claim 1 wherein said correlator means comprises:

first and second storage means connected to receive said first and second signals respectively for temporarily storing said first and second signals;

time delay means connected to receive said first signal from said first storage means and said shift signal for delaying said first signal by a predetermined period of time;

multiplier means connected to receive the delayed first signal and the second signal for providing a product signal thereof;

averaging means connected to receive said product signal for providing an average signal indicative of the similarity of the first and second signals;

detector means connected to receive said product signal and said average signal for detecting peak values in said product signal and for transmitting said average signal to said processor means whenever said peak values are detected, said transmitted average signal constituting the maximum similarity signal.

3. The system according to claim 2 wherein the detector means comprises:

envelope detector means connected to receive the product signal for providing a level signal indicative of the instantaneous amplitude of said product signal; and threshold detector means connected to receive said level signal and the average signal for providing the maximum similarity signal to said processor means whenever said level signal goes above a predetermined value.

4. A system for determining the ground speed of a vehicle comprising:

a first magnetometer mounted in a forward section of the vehicle, said first magnetometer having sufficient sensitivity to detect a geomagnetic field and being capable of generating a first signal representative thereof;

a second magnetometer mounted in a rearward section of the vehicle a predetermined distance from said first magnetometer, said second magnetometer having sufficient sensitivity to detect a geomagnetic field and being capable of generating a second signal representative thereof;

first and second digital converters connected to receive the first and second analog signals respectively for providing first and second digital signals respectively;

first and second storage registers respectively connected to receive the outputs of said first and second digital converters;

a shift register connected to receive the output of said first storage register;

a multiplier circuit connected to receive output signals from said shift register and said second storage register for providing a product signal thereof;

an envelope detector circuit connected to receive the product signal for providing a level signal representative of the instantaneous amplitude of the product signal;

an averaging circuit also connected to receive the product signal for providing an average signal representative of the cross-correlation of the first and second signals;

a peak detecting circuit connected to receive the level signal and the average signal for providing maximum similarity signals whenever said level signal exceeds a predetermined value; and computing means connected to receive the maximum similarity signals from said peak detecting circuit and programmed for computing the velocity of the vehicle based on the distance between the first and second magnetometers.

* * * * *